United States Patent
Lane et al.

(10) Patent No.: US 12,436,947 B2
(45) Date of Patent: *Oct. 7, 2025

(54) DATABASE SEARCH QUERY ENHANCER

(71) Applicant: Sabre GLBL Inc., Southlake, TX (US)

(72) Inventors: Matthew Morgan Lane, Southlake, TX (US); Saunvit Dinesh Pandya, The Colony, TX (US)

(73) Assignee: SABRE GLBL INC., Southlake, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,716

(22) Filed: Oct. 6, 2023

(65) Prior Publication Data

US 2024/0111765 A1    Apr. 4, 2024

Related U.S. Application Data

(63) Continuation of application No. 16/992,975, filed on Aug. 13, 2020, now Pat. No. 11,809,420.

(51) Int. Cl.
*G06F 16/2453* (2019.01)
*G06N 20/00* (2019.01)

(52) U.S. Cl.
CPC ......... *G06F 16/2453* (2019.01); *G06N 20/00* (2019.01)

(58) Field of Classification Search
CPC .................................................. G06F 16/2453
USPC ........................................................ 707/713
See application file for complete search history.

(56) References Cited

U.S. PATENT DOCUMENTS

| 9,104,733 | B2 | 8/2015 | Gao et al. | |
| 10,748,159 | B1* | 8/2020 | Selinger | G06Q 30/02 |
| 2004/0254920 | A1* | 12/2004 | Brill | G06F 16/9535 |
| 2011/0125764 | A1* | 5/2011 | Carmel | G06F 16/3338 |
| | | | | 707/E17.014 |
| 2014/0105488 | A1* | 4/2014 | Geng | G06F 18/2193 |
| | | | | 382/161 |

(Continued)

FOREIGN PATENT DOCUMENTS

WO    WO2018035248    2/2018

OTHER PUBLICATIONS

European Patent Office, Communication pursuant to Article 94(3), Application No. 21189901.8, dated Apr. 10, 2024, 7 pages.

(Continued)

*Primary Examiner* — Syling Yen
(74) *Attorney, Agent, or Firm* — Baker Botts L.L.P.

(57) ABSTRACT

An apparatus includes a memory and a hardware processor that receives a query from a device. The query includes first search parameters. The processor also retrieves, from a database and based on the first search parameters, a plurality of previously issued queries and applies a machine learning algorithm on the plurality of previously issued queries to determine second search parameters. The processor further adds the second search parameters to the query to form an enhanced query and communicates the enhanced query to a plurality of response systems. The processor then receives, from the plurality of response systems, a plurality of responses to the enhanced query, constructs, based on the plurality of responses to the enhanced query, an enhanced response to the query, and communicates the enhanced response to the device for selection of a response from the plurality of responses.

18 Claims, 10 Drawing Sheets

(56) References Cited

U.S. PATENT DOCUMENTS

2020/0019632 A1* 1/2020 Larchev ............... G06F 16/242

OTHER PUBLICATIONS

European Search Report in EP Application No. 21189901.8-1231 dated Jan. 5, 2022.

* cited by examiner

DATABASE SEARCH QUERY ENHANCER

CROSS-REFERENCE TO RELATED APPLICATION

This non-provisional application is a continuation, under 35 U.S.C. § 120, of U.S. patent application Ser. No. 16/992,975 filed on Aug. 13, 2020 by Matthew Morgan LANE, et al. and entitled "DATABASE SEARCH QUERY ENHANCER", now U.S. Pat. No. 11,809,420 which is hereby incorporated by reference in its entirety.

TECHNICAL FIELD

This disclosure relates generally to database queries, and more specifically, to a tool that enhances search queries.

BACKGROUND

Organizations often store large amounts of data in databases. The amount of data maintained by a particular organization may be quite large. As the amount of data grows, the resources and time needed to query the data and to derive meaningful results from that data also increase.

SUMMARY

Organizations often store large amounts of data in databases. The amount of data maintained by a particular organization may be quite large. As the amount of data grows, the resources and time needed to query the data and to derive meaningful results from that data also increase. Complicating matters further, in certain contexts, a user initiating a search may send the search through an intermediary, who then directs the search to multiple entities. These entities then perform the search and provide the results to the intermediary. The intermediary presents the combined results to the user, and the user selects one or more of the results from the various entities that are most meaningful and/or applicable to the user. The amount of data that is queried and processed in these types of searches (e.g., data at the intermediary and the data at each searching entity) increases dramatically over a traditional database query. Thus, these types of searches expend a large amount of time and machine resources. Additionally, when the entities do not perform searches that produce meaningful or applicable results, the user does not select those responses and, as a result, the resources spent performing those searches (e.g., processor and network resources) are considered wasted.

This disclosure contemplates a search query enhancer at an intermediary that provides entities with enhanced queries. The enhanced queries include information that assists search entities to respond with more meaningful and/or applicable results. To retrieve the information for the enhanced queries, the search query enhancer may need to query the intermediary's database, which may contain a large dataset. The search query tool uses a machine learning algorithm to examine the data in the intermediary's database to efficiently determine information that would be meaningful and helpful to a searching entity. The search query enhancer also uses this information to process the responses from the searching entities and to generate an enhanced response that is more meaningful to the querying user. In this manner, the search query tool reduces the likelihood that a searching entity wastes processing and network resources. Additionally, the search query tool reduces the likelihood that the intermediary wastes processing and network resources in querying its own databases to provide enhanced queries. Furthermore, without using this machine learning process, the intermediary would not be able to determine meaningful information for the search entities in time for the search entities to perform their searches and to return responses to a user in a reasonable amount of time. Thus, the search query enhancer provides a practical application in that it reduces waste of processing and network resources and it improves the meaningfulness and applicability of search results in certain embodiments.

According to an embodiment, an apparatus includes a memory and a hardware processor communicatively coupled to the memory. The hardware processor receives a query from a device. The query includes first search parameters. The processor also retrieves, from a database and based on the first search parameters, a plurality of previously issued queries and applies a machine learning algorithm on the plurality of previously issued queries to determine second search parameters. The processor further adds the second search parameters to the query to form an enhanced query and communicates the enhanced query to a plurality of response systems. The processor then receives, from the plurality of response systems, a plurality of responses to the enhanced query, constructs, based on the plurality of responses to the enhanced query, an enhanced response to the query, and communicates the enhanced response to the device for selection of a response from the plurality of responses.

Similarly, the entities' querying systems may be enhanced to provide more meaningful responses to the intermediary. For example, the querying systems may be enhanced to properly interpret the enhanced queries and to determine when additional resources should be used to respond to the enhanced query. Thus, the enhanced query response systems provide a practical application in that they reduce the amount of wasted processing and network resources while providing more meaningful information to an end user.

According to an embodiment, a query response enhancer includes a memory and a hardware processor communicatively coupled to the memory. The hardware processor receives a query from a device. The query includes first search parameters and second search parameters. The first search parameters are provided by a user. The second search parameters are determined by applying a machine learning algorithm on a plurality of queries previously issued by the user. The processor determines, based on the first and second search parameters, a response parameter and constructs a response to the query. The response includes the response parameter. The processor then transmits the response to the device to respond to the query.

Certain embodiments provide one or more technical advantages. For example, an embodiment reduces the amount of processor and network resources that are wasted when querying databases using inadequate information. As another example, an embodiment reduces the processor and network resources that are wasted providing information that is not meaningful or applicable to an end user. Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4C of the drawings, like numerals being used for like and corresponding parts of the various drawings.

Organizations often store large amounts of data in databases. The amount of data maintained by a particular organization may be quite large. As the amount of data grows, the resources and time needed to query the data and to derive meaningful results from that data also increase. Complicating matters further, in certain contexts, a user initiating a search may send the search through an intermediary, who then directs the search to multiple entities. These entities then perform the search and provide the results to the intermediary. The intermediary presents the results to the user, and the user selects one or more of the results from the various entities that are most meaningful and/or applicable to the user. The amount of data that is queried and processed in these types of searches (e.g., data at the intermediary and the data at each searching entity) increases dramatically over a traditional database query. Thus, these types of searches expend a large amount of time and machine resources. Additionally, when the entities do not perform searches that produce meaningful or applicable results, the user does not select those responses and, as a result, the resources spent performing those searches (e.g., processor and network resources) are considered wasted.

Figure 1:
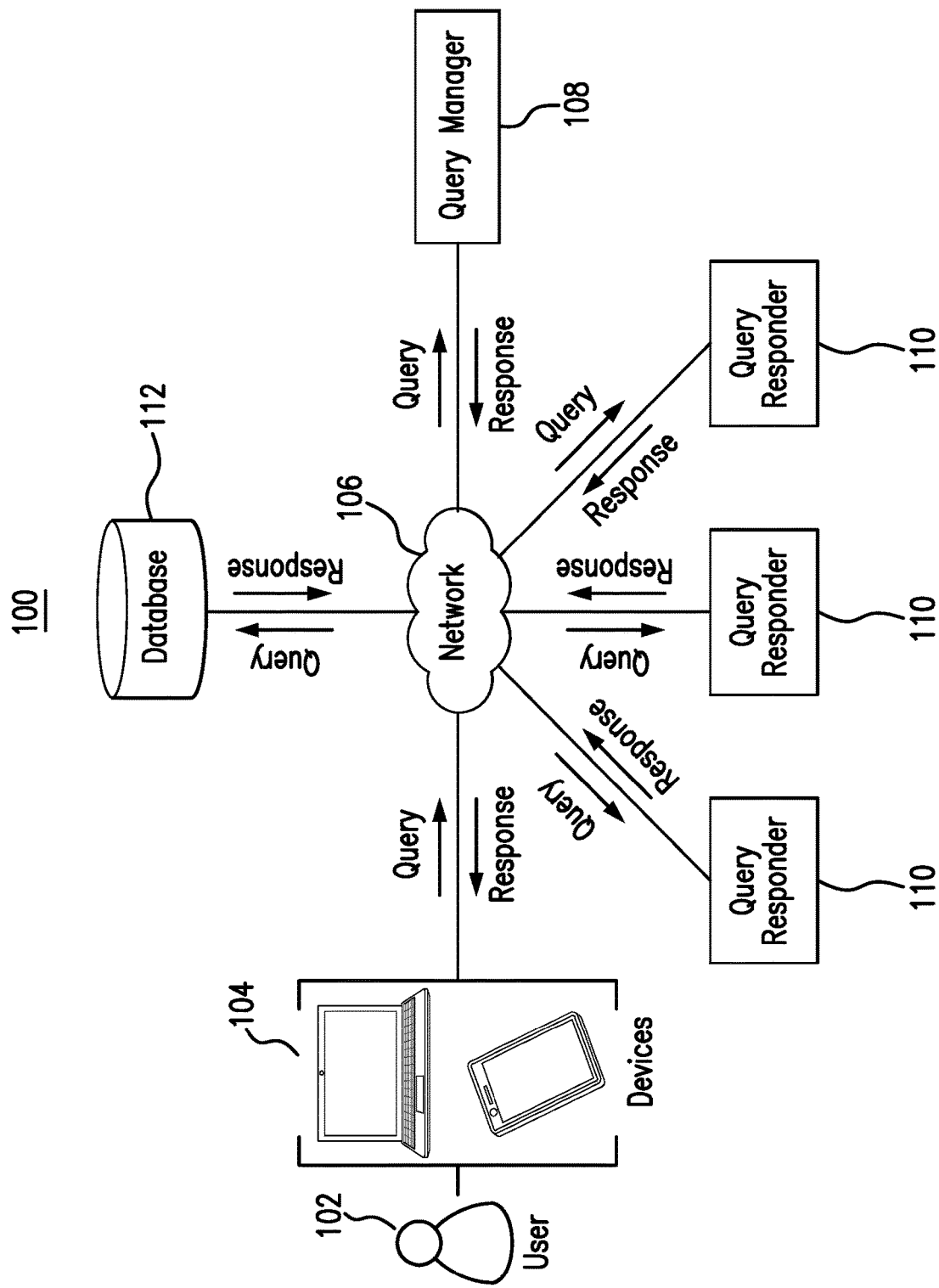
FIG. 1 illustrates an example system for querying databases.

FIG. 1 illustrates an example system 100 for querying databases. As seen in FIG. 1, system 100 includes one or more devices 104 of a user 102, a network 106, a query manager 108, one or more query responders 110, and a database 112. Generally, user 102 uses devices 104 to initiate queries to query manager 108. Query manager 108 directs queries to one or more query responders 110 and/or to database 112. Query manager 108 then directs responses to the query back to devices 104. In this manner, query manager 108 operates as a search intermediary.

User 102 uses one or more devices 104 to interact with other components of system 100. For example, user 102 uses devices 104 to initiate queries and to receive responses to those queries. When devices 104 receive one or more responses to the query, devices 104 may present the responses to user 102. User 102 may then select one or more of the responses based on the responses meaningfulness and/or applicability to the user 102. The responses that are not selected are unused or discarded by devices 104. System 100 includes any number of users 102 and any number of devices 104.

Devices 104 include any appropriate device for communicating with components of system 100 over network 106. This disclosure contemplates device 104 being any appropriate device for sending and receiving communications over network 106. As examples, and not by way of limitation, device 104 may be a computer, a laptop, a wireless or cellular telephone, an electronic notebook, a personal digital assistant, a tablet, a kiosk, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Query manager 108 operates as the search intermediary in system 100. Generally, query manager 108 receives queries from devices 104 and directs responses to that query to devices 104. Query manager 108 may send queries to one or more query responders 110 or directly to database 112. In response, the one or more query responders 110 for the database 112 may communicate one or more responses to the query to query manager 108. Query manger 108 may then organize the responses and direct the responses back to devices 104.

Query responders 110 operate as the searching entities in system 100. Generally, query responders 110 can provide responses to queries in one of two ways. First, query responders 110 can receive queries directly from query manager 108. Query responder 110 can then initiate searches against a database 112 to produce a response. Query responder 110 can then communicate the response back to query manager 108. When query manager 108 has received responses from the one or more query responders 110, query manager 108 can organize those responses and communicate the responses to devices 104. In this process, each query responder 110 may hold its own version of database 112. Each version of database 112 may contain the data for a particular query responder 110.

A second way that query responders 110 provide responses to a query is by updating database 112 with information from the query responder 110. For example, database 112 may be a centralized database 112 that holds the information of each query responder 110. Each query responder 110 is responsible for maintaining its own information in database 110 and keeping that information current. When query manager 108 receives a query from devices 104, query manager 108 communicates that query directly to database 112. Database 112 may then communicate a response to query manager 108. The response may be formed using information from each query responder 110. Query manager 108 organizes the information in the response and communicates the response back to devices 104.

The amount of data held in system 100 increases as the number of query responders 110 increases and/or as the information maintained by each query responder 110 increases. As a result, the amount of machine resources (e.g., processor and network resources) and time expended to respond to a query also increases. In other words, the larger the dataset, the more machine resources and time is needed to execute a query against the dataset. Additionally, the data may be agnostic for a particular user 102. Thus, the responses formed by executing a query against that data may ultimately be meaningless and inapplicable for a particular user 102. As a result, the machine resources and time expended to execute that query and form the response is ultimately wasted because the user 102 is unlikely to select that response.

This disclosure contemplates a search query enhancer at an intermediary that provides search entities with enhanced queries. The enhanced queries include information that assists search entities to reduce system resources and/or to respond with more meaningful and/or applicable results. To retrieve the information for the enhanced queries, the search query enhancer may need to query the intermediary's database, which may contain a large dataset. The search query tool uses a machine learning algorithm to examine the data in the intermediary's database to efficiently determine information that would be meaningful and helpful to a searching entity. The search query enhancer also uses this information to process the responses from the searching entities and to generate an enhanced response that is more meaningful to the querying user. In this manner, the search query tool reduces the likelihood that a searching entity wastes machine resources. Additionally, the search query tool reduces the likelihood that the intermediary wastes machine resources in querying its own databases to provide enhanced queries. Furthermore, without using this machine learning process, the intermediary would not be able to determine meaningful information for the search entities in time for the search entities to perform their searches and to return responses to a user in a reasonable amount of time. Thus, the search query enhancer provides a practical application in that it reduces waste of processing and network resources and it improves the meaningfulness and applicability of search results in certain embodiments.

Similarly, the search entities' querying systems may be enhanced to provide more meaningful responses to the intermediary. For example, the querying systems may be enhanced to properly interpret the enhanced queries and to determine when additional resources should be used to respond to the enhanced query. Thus, the enhanced query response systems provide a practical application in that they reduce the amount of wasted processing and network resources while providing more meaningful information to an end user. The enhanced query system will be described in more detail using FIGS. 2A-2D, 3A-3B, and 4A-4C.

Figure 2A:
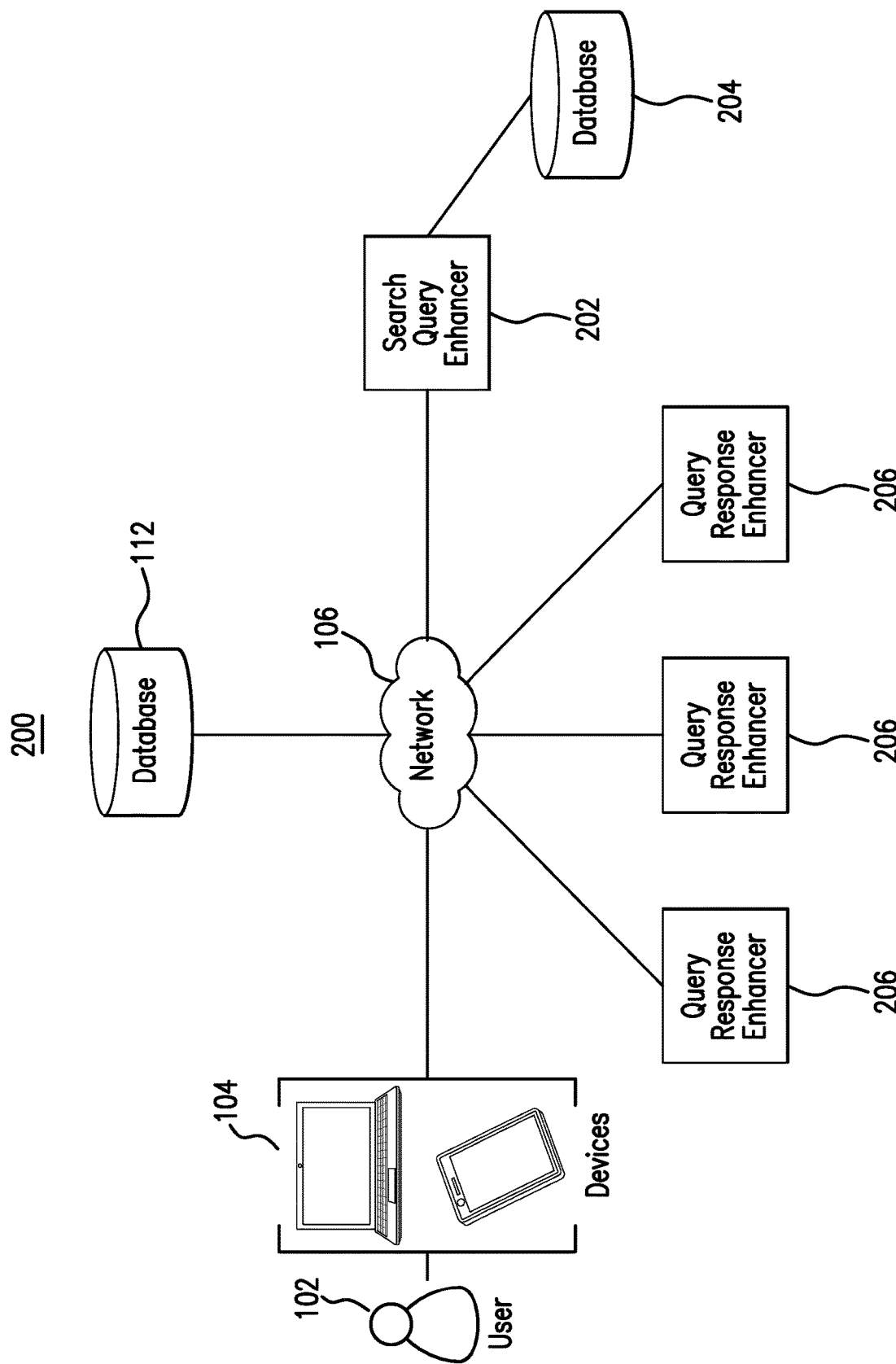
FIGS. 2A-2D illustrate an enhanced database querying system.

FIGS. 2A-2D illustrate an enhanced database query system 200. As seen in FIG. 2A, system 200 includes one or more devices 104, network 106, a database 112, a search query enhancer 202, a database 204, and one or more query response enhancers 206. Generally, system 200 reduces the waste of machine resources (e.g., processor and network resources) related to executing queries to form responses by enhancing the queries and responses using information from previously issued queries, responses, and/or user selections. Search query enhancer 202 may enhance queries and responses by providing additional information based on previously issued queries, responses, and/or user selections. Additionally, query response enhancers may enhance responses by modifying provided responses with additional information. As a result, queries and responses may be enhanced to increase the likelihood that user 102 selects one or more responses, thereby reducing wasted processing and network resources used to form unselected responses.

The components of system 200 may be arranged in any suitable configuration. For example, one or more components, such as search query enhancer 202 and query response enhancer(s) 206, may be hosted on a single, physical server/computer that communicates with other components of system 200 through network 106. As another example, the components of system 200 may be distributed in a cloud environment. Search query enhancer 202 and/or query response enhancer(s) 206 may be hosted on separate, physical servers/computers that communicate with each other and with other components of system 200 through network 106. These separate servers/computers may be located in different geographic locations and/or sites.

Several of the components of system 200 operate similarly as they did in system 100. For example, devices 104 may be used by user 102 to form and communicate queries and to receive responses to those queries. Network 106 may allow the various components of system 200 to communicate with one another. Database 112 stores information from the query response enhancers 206. In certain embodiments, each query response enhancer 206 may maintain its own version of database 112. In certain embodiments, database 112 may be a centralized database and each query response enhancer 206 is responsible for maintaining its own information in database 112.

Search query enhancer 202 operates as the search intermediary in system 200. Generally, search query enhancer 202 enhances queries and/or responses in system 200 by adding information to the queries and/or responses. Search query enhancer 202 may glean this information by applying a machine learning algorithm to data held and/or maintained by search query enhancer 202. As seen in FIG. 2A, search query enhancer 202 holds data in database 204. For example, database 204 may hold information about previously issued queries, previous responses, and previous selections. Because the dataset in database 204 may be quite large, search query enhancer 202 may be unable to glean information from the dataset through traditional processes. For example, without using this machine learning process, search query enhancer 202 would not be able to determine meaningful information for the query response enhancers 206 in time for query response enhancers 206 to perform their searches and to return responses to user 102 in a reasonable amount of time. However, by applying a machine-learning algorithm against the dataset in database 204, search query enhancer 202 may be able to glean useful information from the data such that query response enhancers 206 can use that information to form responses. The information may then be used to enhance queries and/or responses to make them more meaningful and applicable for user 102. The operation of search query enhancer 202 will be described in more detail using FIGS. 2B and 2D.

Query response enhancers 206 operate as the search entities in system 200. Query response enhancers 206 may receive queries and provide responses to those queries. In some embodiments, query response enhancers may receive queries and execute those queries against an internal database 112 to provide a response to those queries. In some embodiments, query response enhancers 206 may maintain information in a central database 112. Search query enhancer 202 may execute queries against database 112 to form responses. The operation of query response enhancer 206 will be described in more detail using FIG. 2C.

Figure 2B:
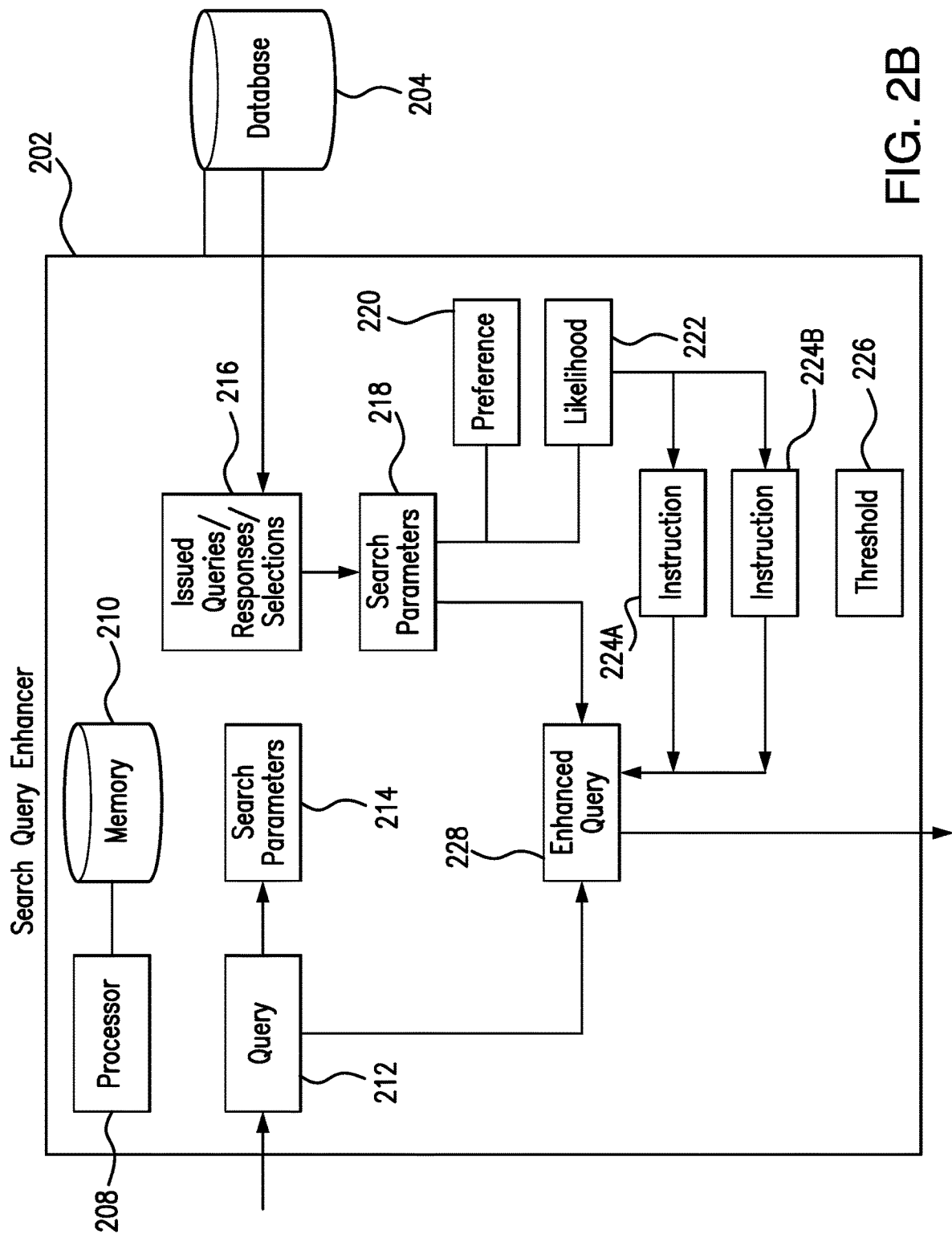

FIG. 2B illustrates search query enhancer 202 forming an enhanced query. As seen in FIG. 2B, search query enhancer 202 includes a processor 208 and a memory 210. Processor 208 and memory 210 may be configured to perform any of the functions of search query enhancer 202 described herein. In particular embodiments, by forming the enhanced query, search query enhancer 202 reduces the amount of processing and network resources wasted when responding to queries initiated by user 102.

Processor 208 is any electronic circuitry, including, but not limited to microprocessors, application specific integrated circuits (ASIC), application specific instruction set processor (ASIP), and/or state machines, that communicatively couples to memory 210 and controls the operation of search query enhancer 202. Processor 208 may be 8-bit, 16-bit, 32-bit, 64-bit or of any other suitable architecture. Processor 208 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 208 may include other hardware and software that operates to control and process information. Processor 208 executes software stored on memory to perform any of the functions described herein. Processor 208 controls the operation and administration of search query enhancer 202 by processing information received from network 106, device(s) 104, and memory 210. Processor 208 may be a programmable logic device, a microcontroller, a microprocessor, any suitable processing device, or any suitable combination of the preceding. Processor 208 is not limited to a single processing device and may encompass multiple processing devices.

Memory 210 may store, either permanently or temporarily, data, operational software, or other information for processor 208. Memory 210 may include any one or a combination of volatile or non-volatile local or remote devices suitable for storing information. For example, memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 210, a disk, or a flash drive. In particular embodiments, the software may include an application executable by processor 208 to perform one or more of the functions described herein.

Search query enhancer 202 receives a query 212. Query 212 may be initiated by user 102 using one or more devices 104. Query 212 includes search parameters 214. Search parameters 214 may limit the breadth of query 212 and may reflect the desires of user 102 who issued query 212. For example, search parameters 214 may include search terms or certain search fields. Search parameters 214 may also identify user 102. User 102 may provide information through device 104 that forms part or all of search parameters 214. Device 104 may generate query 212 using parameters 214 provided by user 102.

Search query enhancer 202 retrieves previously issued queries, previous responses, or previous selections 216 from database 204. In certain embodiments, search query enhancer 202 retrieves queries that were previously issued by the user 102, who issued query 212, responses previously communicated to user 102 in response to query 212, or selections previously made by user 102 from the communicated responses. Search query enhancer 202 may then analyze previously issued queries, previous responses, or previous selections 216 to glean information about user 102 that can be used to form an enhanced query. In some embodiments, search query enhancer 202 may also retrieve previously issued queries, previous responses, or previous selections 216 of other users to glean information that may be useful in providing a meaningful and applicable response to user 102. Because the amount of information in previously issued queries, previous responses, or previous selections 216 may be large, search query enhancer 202 applies a machine learning algorithm on previously issued queries, previous responses, or previous selections 216 to glean information that may be useful in forming the enhanced query. For example, search query enhancer 202 may cluster the information in previously issued queries, previous responses, or previous selections 216 and then these clusters may be used to help glean useful information. As explained previously, without applying a machine learning process, search query enhancer 202 would not be able to determine meaningful information from previously issued queries, previous responses, or previous selections 216 in time for query response enhancers 206 to perform their searches and to return responses to user 102 in a reasonable amount of time. However, by applying a machine-learning algorithm against the previously issued queries, previous responses, or previous selections 216, search query enhancer 202 may be able to glean useful information from the data, such that query response enhancers 206 can use that information to form responses.

In certain embodiments, by applying the machine learning algorithm to the previously issued queries, previous responses, or previous selections 216, search query enhancer 202 determines search parameters 218 that can be used to form the enhanced query. For example, search parameters 218 may include one or more preferences 220. Preferences 220 may be specific preferences of user 102 that are determined based on previously issued queries, previous responses, or previous selections 216 of the user 102 or other users 102. By incorporating these preferences 220 into an enhanced query, it becomes more likely that user 102 will select a response generated by executing the enhanced query.

In certain embodiments, search parameters 218 may further include a likelihood 222. For example, likelihood 222 may indicate a likelihood that user 102 will select a response generated by a particular query response enhancer 206. As another example, likelihood 222 may indicate a likelihood that query 212 was automatically and programmatically generated (e.g., by an artificial intelligence system) rather than by a human user 102. This disclosure contemplates likelihood 222 including any number of indicated likelihoods. Likelihood 222 may be generated based on information about what responses were selected by user 102 for the previously issued queries 216. Likelihood 222 may further be based on the various preferences 220 that were gleaned from the previously issued queries 216.

Search query enhancer 202 may compare likelihood 222 to a threshold 226 to determine what actions should be taken to respond to query 212. For example, search query enhancer 202 may compare likelihood 222 to threshold 226 to determine whether responses from a particular query response enhancer 206 are sufficiently likely to be selected by user 102. Search query enhancer 202 may provide one or more instructions 224, depending on the comparison of likelihood 222 to threshold 226. For example, if the likelihood 222 of user 102 selecting a response from a particular query response enhancer 206 does not exceed threshold 226, then search query enhancer 202 may include instruction 224A in the enhanced query that instructs the query response enhancer 206 to not expend additional processing and/or network resources in forming a response to the query. If likelihood 222 exceeds threshold 226 then search query enhancer 202 may include an instruction 224B in the enhanced query that instructs the query response enhancer 206 to expend additional processing and/or network resources in generating a response to the enhanced query. In this manner, search query enhancer 202 can instruct query response enhancers 206 to perform less or additional work in responding to an enhanced query based on the likelihood 222 that that work may be wasted through an unselected response.

As another example, search query enhancer 202 may compare likelihood 222 to threshold 226 to determine whether it is likely that query 212 was automatically and programmatically generated (e.g., by an artificial intelligence system) rather than by a human user 102. If is it likely that query 212 was generated by an AI system, then search query enhancer 202 may determine that a human user 102 may not be selecting responses, and thus, it may be more expedient to use instruction 224A to instruct a query response enhancer 206 to not expend additional machine resources to create a response that is tailored for user 102.

Search query enhancer 202 then forms enhanced query 228 using query 212, search parameters 214, search parameters 218, and instruction 224. Search query enhancer 202 communicates enhanced query 228 to other components of system 200 (e.g., query response enhancers 206 and/or database 112) and awaits responses.

In certain embodiments, search query enhancer 202 is not provided the identity of user 102 or information that would identify user 102. Instead, query 212 may include information that identifies a category of users to which user 102 belongs. For example, search query enhancer 202 may determine from query 212 that user 102 is a corporate or individual user, a frequent or infrequent user, a business or leisure traveler, a domestic or international traveler, a daytime or evening traveler, etc. Search query enhancer 202 may form enhanced query 228 using information about the category of users. For example, search query enhancer 202 may retrieve previous queries 216 issued by the category of users rather than previous queries issued solely by user 102. As another example, search query enhancer 202 may retrieve previous responses 216 communicated to the category of users or previous selections 216 made by the category of users. The retrieved information may then be used to form enhanced query 228.

Figure 2C:
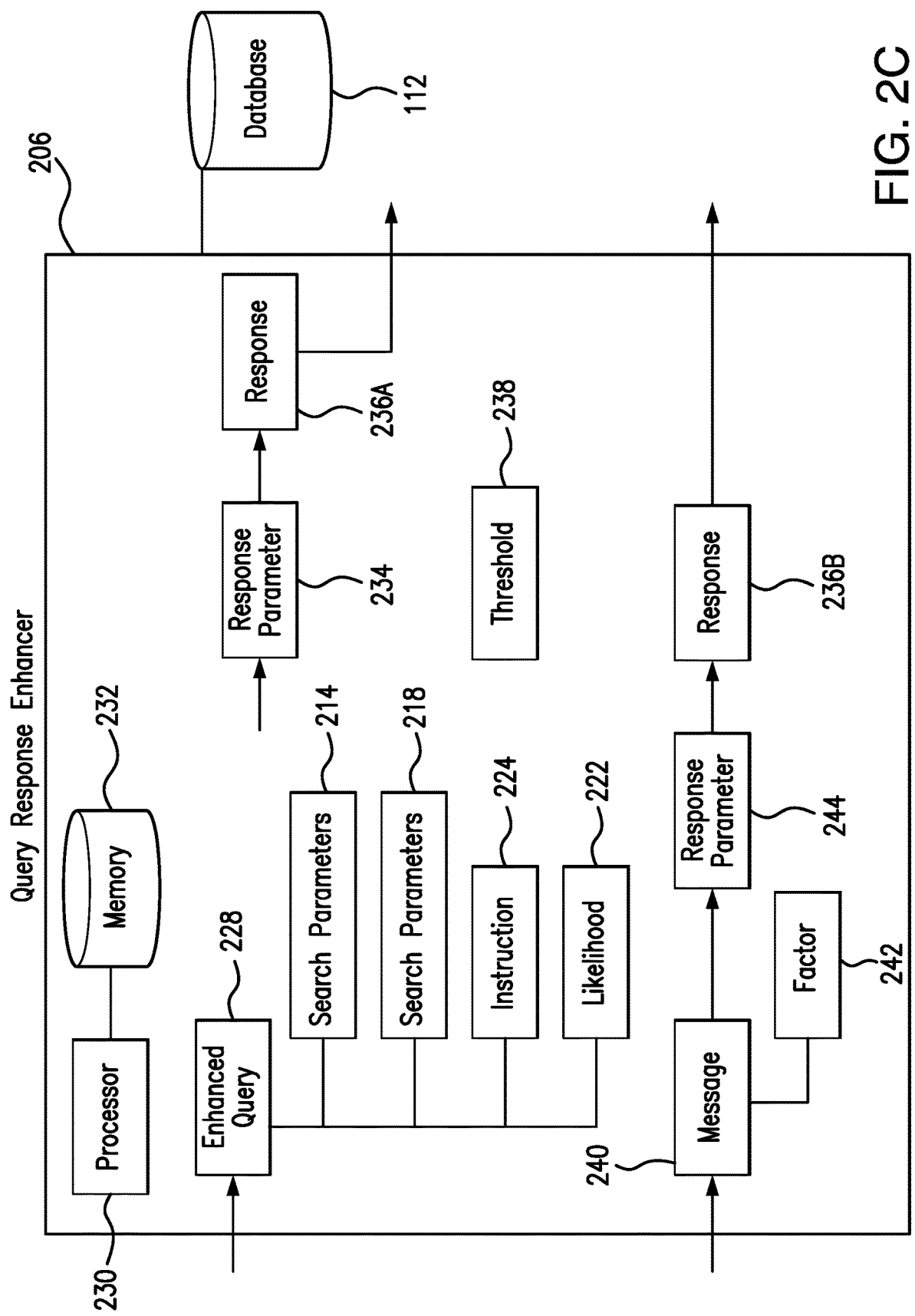

FIG. 2C illustrates an example query response enhancer 206 of system 200. As seen in FIG. 2C, query response enhancer 206 includes a processor 230 and a memory 232. Processor 230 and memory 232 are configured to perform any of the functions of query response enhancer 206 described herein. In certain embodiments, query response enhancer 206 reduces the waste of machine recourses (e.g., processor and network resources) expended to execute queries against database 112 by responding to enhanced queries 228 and by updating responses to enhanced queries 228.

Processor 230 is any electronic circuitry, including, but not limited to microprocessors, application specific integrated circuits (ASIC), application specific instruction set processor (ASIP), and/or state machines, that communicatively couples to memory 232 and controls the operation of query response enhancer 206. Processor 230 may be 8-bit, 16-bit, 32-bit, 64-bit or of any other suitable architecture. Processor 230 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 230 may include other hardware and software that operates to control and process information. Processor 230 executes software stored on memory to perform any of the functions described herein. Processor 230 controls the operation and administration of query response enhancer 206 by processing information received from network 106, device(s) 104, and memory 232. Processor 230 may be a programmable logic device, a microcontroller, a microprocessor, any suitable processing device, or any suitable combination of the preceding. Processor 230 is not limited to a single processing device and may encompass multiple processing devices.

Memory 232 may store, either permanently or temporarily, data, operational software, or other information for processor 230. Memory 232 may include any one or a combination of volatile or non-volatile local or remote devices suitable for storing information. For example, memory 232 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 232, a disk, or a flash drive. In particular embodiments, the software may include an application executable by processor 230 to perform one or more of the functions described herein.

Query response enhancer 206 receives enhanced query 228 from search query enhancer 202 in certain embodiments. Query response enhancer 206 generally provides a response to enhanced query 228. As seen in FIG. 2C, enhanced query 228 may include search parameters 214 that were provided by user 102, search parameters 218 that were provided by search query enhancer 202, instruction 224 that was provided by search query enhancer 202, and likelihood 222 that was provided by search query enhancer 202. As discussed previously, instruction 224 may instruct query response enhancer 206 how to respond to enhance query 228 such as, for example, by querying database 112 or by expending additional machine resources to consider search parameters 218. As discussed above, likelihood 222 may reflect a likelihood that query 212 was automatically and programmatically generated, for example, by an artificial intelligence system rather than by user 102.

In certain embodiments, query response enhancer 206 generates response parameters 234 based on search parameters 214 and search parameters 218. Response parameters 234 may include information that query response enhancer 206 will include in a response 236. Query response enhancer 206 may determine response parameters 234 by querying database 112 using search parameters 214 and/or search parameters 218. For example, the tables in database 112 may indicate that certain response parameters 234 should be included in a response 236 when certain search parameters 214 and/or 218 are presented.

Query response enhancer 206 generates a response 236A to enhanced query 228. In certain embodiments, query response enhancer 206 generates response 236A by executing enhanced query 228 directly against database 112. For example, instruction 224 may instruct query response enhancer 206 to save resources by executing enhanced query 228 directly against database 112 using only search parameters 214. Instruction 224 may have been determined because search query enhancer 202 determined that a likelihood 222 of user 102 selecting response 236A from query response enhancer 206 falls below a threshold 226. Because it was determined that user 102 is unlikely to select response 236A, instruction 224 may instruct query response enhancer 206 to save resources by executing enhanced query 228 directly against database 112 using only search parameters 214. When executing enhanced query 228 against database 112, query response enhancer 206 may query database 112 using search parameters 214 but not search parameters 218 to conserve resources.

In some embodiments, query response enhancer 206 may generate response 236A through a more thorough analysis of search parameters 214 and/or search parameters 218. For example, instruction 224 may instruct query response enhancer 206 to expend additional resources to respond to enhanced query 228 because it was determined that the likelihood 222 of user 102 selecting response 236A from query response enhancer 206 exceeds threshold 226. In response, query response enhancer 206 may consider search parameters 214 and/or search parameters 218 in constructing response 236A. In this manner, query response enhancer 206 expends additional resources to consider parameters such as the preferences 220 of user 102 to construct a response 236A that is more meaningful and applicable to user 102. As a result, query response enhancer 206 uses machine resources efficiently to construct a response 236A that is tailored for user 102 when it is more likely that user 102 will select response 236A. When user 102 is not likely to select response 236A, query response enhancer 206 saves resources by querying database 112 using only search parameters 214. In some embodiments, query response enhancer 206 may query database 112 using search parameters 214 and search parameters 218 to form response 236A. In particular embodiments, query response enhancer 206 may use a separate artificial intelligence system or an administrator to consider search parameters 214 and search parameters 218 to form response 236A.

In some embodiments, likelihood 222 indicates a likelihood that query 212 was automatically and programmatically generated (e.g., by an artificial intelligence system). Likelihood 222 may have been determined by search query enhancer 202. Query response enhancer 206 may determine whether that likelihood 222 exceeds a threshold 238. If that likelihood 222 exceeds threshold 238, query response enhancer 206 may determine that there is likely not a human user 102 differentiating amongst the various responses 236. As a result, query response enhancer 206 may generate response 236A by directly querying database 112 using search parameters 214. In this manner, query response enhancer 206 saves machine resources by not tailoring response 236A to any user 102 when there is likely not a human user 102 present to select amongst the responses 236.

In certain embodiments as described further below, search query enhancer 202 may provide query response enhancer 206 an opportunity to provide an iterative response 236B. For examples, search query enhancer 202 may evaluate response 236A and determine certain factors 242 that may impact a likelihood that a user 102 will select response 236A. Search query enhancer 202 may communicate a message 240 indicating factor 242 to query response enhancer 206. Query response enhancer 206 may receive message 240 and analyze factor 242 to determine response parameter 244. Response parameter 244 may be determined based on factor 242. For example, query response enhancer 206 may change one or more response parameter 234 based on factor 242 to produce response parameter 244. Query response enhancer 206 may then generate response 236B using response parameter 244 to incorporate the change based on factor 242. Query response enhancer 206 may then communicate response 236B to search query enhancer 202 in response to message 240. In this manner, query response enhancer 206 may receive feedback and provide responses 236 that are even more likely to be selected by user 102.

Figure 2D:
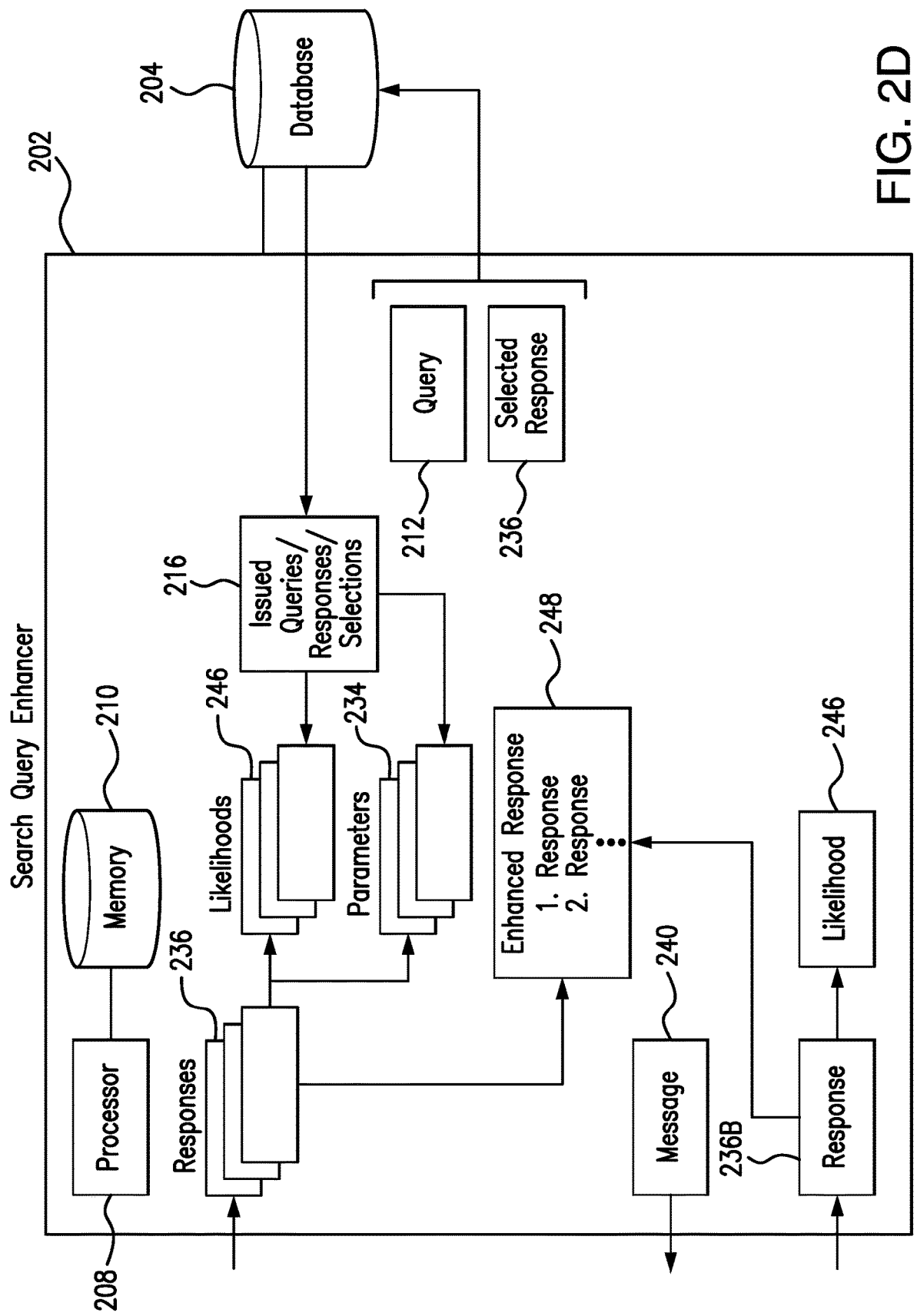

FIG. 2D illustrates search query enhancer 202 receiving and aggregating responses 236 from one or more query response enhancers 206. As seen in FIG. 2D, search query enhancer 202 receives one or more responses 236 in response to communicating an enhanced query 228 to one or more query response enhancers 206. Each response 236 may have been received from a different query response enhancer 206. Search query enhancer 202 may then organize the responses 236 to form an enhanced response 248

Search query enhancer 202 may determine likelihoods 246 that indicate the likelihood that user 102 will select a particular response 236. Search query enhancer 202 may determine likelihoods 246 by analyzing the previously issued queries, previous responses, or previous selections 216. Search query enhancer 202 may apply a machine learning algorithm to the previously issued queries, previous responses, or previous selections 216 and then analyze the responses 236 using the information gleaned by applying the machine learning algorithm to determine likelihoods 246. Search query enhancer 202 may organize responses 236 in enhanced response 248 based on the determined likelihoods 246. For example search query enhancer 202 may rank responses 236 based on their determined likelihoods 246. The response 236 with the highest likelihood 246 of being selected by user 102 may be ranked first in enhanced response 248. Search query enhancer 202 may also remove certain responses 236 or keep certain responses 236 from being added to enhanced response 248 based on likelihoods 246. If a response 236 is not likely to be selected by user 102, search query enhancer 202 may conserve machine resources by not adding response 236 to enhance response 248.

In certain embodiments search query enhancer 202 may determine response parameters 234 based on responses 236 and or previously issued queries, previous responses, or previous selections 216. Certain parameters 234 may be provided by query response enhancers 206 in responses 236. Additionally, search query enhancer 202 may apply a machine learning algorithm to previously issued queries, previous responses, or previous selections 216 to determine certain response parameters 234. Search query enhancer 202 may add response parameters 234 into enhanced response 248. Response parameters 234 may indicate certain information that affects the likelihood that a user 102 will select a particular response 236.

In some embodiments, search query enhancer 202 may communicate a message 240 to certain query response enhancers 206 that indicate changes that can be made to a response 236 for that response 236 to be selected by user 102. Message 240 may indicate a factor 242 or the change that will increase the likelihood that a response 236 will be selected. Search query enhancer 202 communicates message 240 to query response enhancer 206 expecting that query response enhancer 206 will analyze the message 240 and provide an updated response 236B. When search query enhancer 202 receives response 236B, search query enhancer 202 may determine updated likelihood 246 for response 236B. Search query enhancer 202 may then add 236B to enhance response 248 based on the determined likelihood 246 that a user 102 will select response 236B.

Search query enhancer 202 then communicates enhanced response 248 to user 102 and/or devices 104. User 102 will then evaluate the various responses 236 in enhanced response 248 and select one or more of the responses 236. Search query enhancer 202 may track which responses 236 are selected by user 102. Search query enhancer 202 may then add query 212 and selected response 236 to database 204 to update the information database 204. This updated information may then be used to enhance subsequent queries and responses from user 102.

Figure 3A:
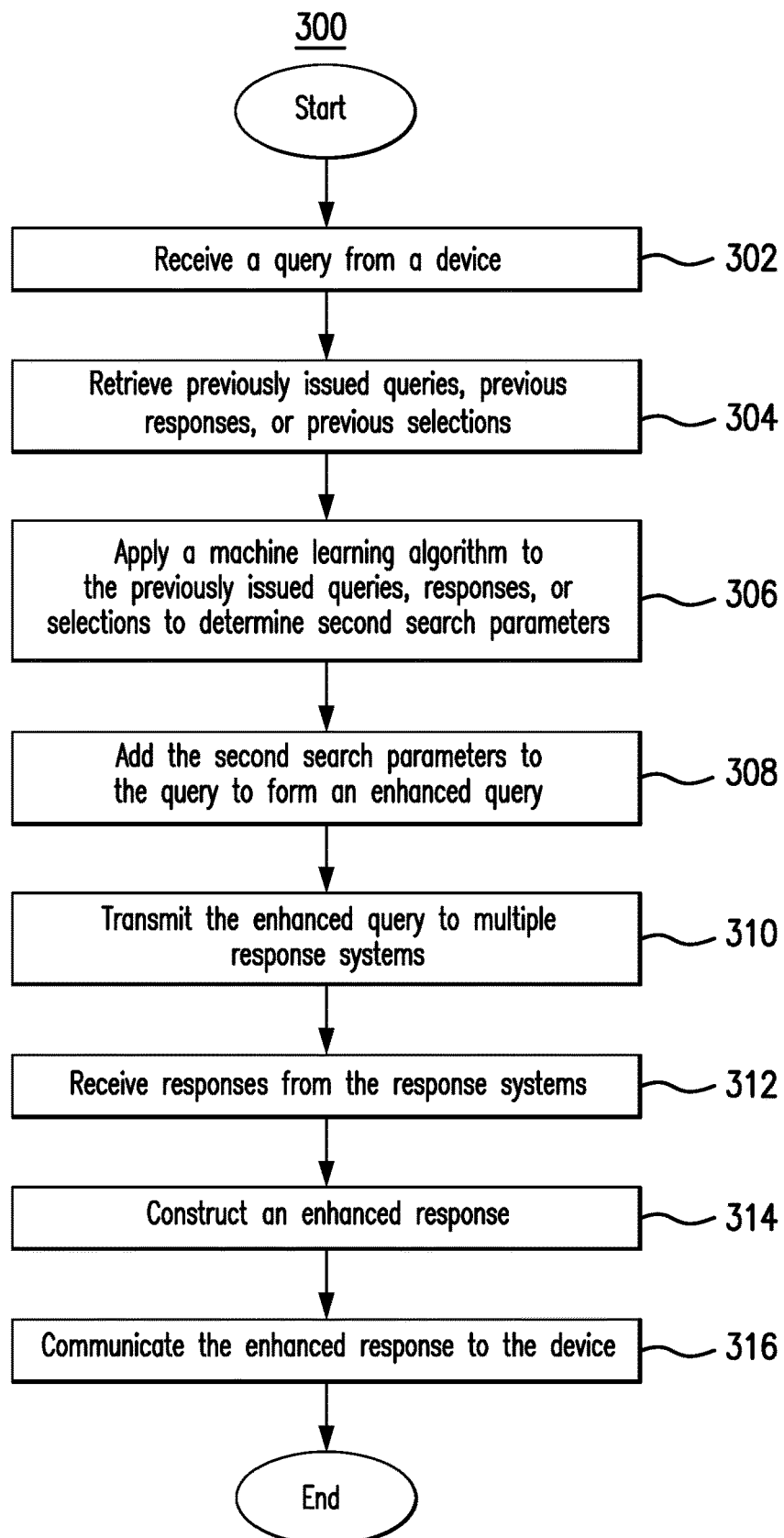
FIGS. 3A-3B are flowcharts illustrating a process of operating the enhanced database querying system.

FIG. 3A illustrates a method 300 of operating search query enhancer 202. In particular embodiments, processor 208 of search query enhancer 202 performs the various steps of method 300. By performing method 300, machine resources (e.g., processor and network resources) may be conserved in providing responses to database queries issued by a user 102.

Search query enhancer 202 begins by receiving a query 212 from a device 104 in step 302. The query may include search parameters 214 provided by user 102. In step 304, search query enhancer 202 retrieves previously issued queries, previous responses, or previous selections 216 from a database 204. These queries, responses, or selections 216 may have been previously issued by user 102 (or a category of users to which user 102 belongs) and contain information about user 102 (of the category of users) that will assist in preparing responses that are more likely to be selected by user 102. Search query enhancer 202 applies a machine learning algorithm to the previously issued queries, previous responses, or previous selections 216 to determine search parameters 218 in step 306. The search parameters 218 may include information such as user preferences 220 and likelihoods 222 that allow for the creation of responses that are more likely to be selected by user 102.

In step 308, search query enhancer 202 adds the second search parameters 218 to the query 212 to form an enhanced query 228. The enhanced query 228 contains information that will assist other components of system 200 to provide responses that are more likely to be selected by user 102. Search query enhancer 202 then transmits the enhanced query 228 to multiple response systems such as, for example, query response enhancers 206, in step 310.

Search query enhancer 202 receives responses 236 from the response systems in step 312. These responses 236 may take into account first search parameters 214 and second search parameters 218. Search query enhancer 202 then constructs an enhanced response 248 in step 314. Enhanced response 248 may include a ranking of the responses 236, based on their likelihoods 246 of being selected by user 102. In step 316, search query enhancer 202 communicates the enhanced response 248 to the device 104. User 102 may analyze the responses 236 and enhanced response 248 and select one or more of these responses 236.

Figure 3B:
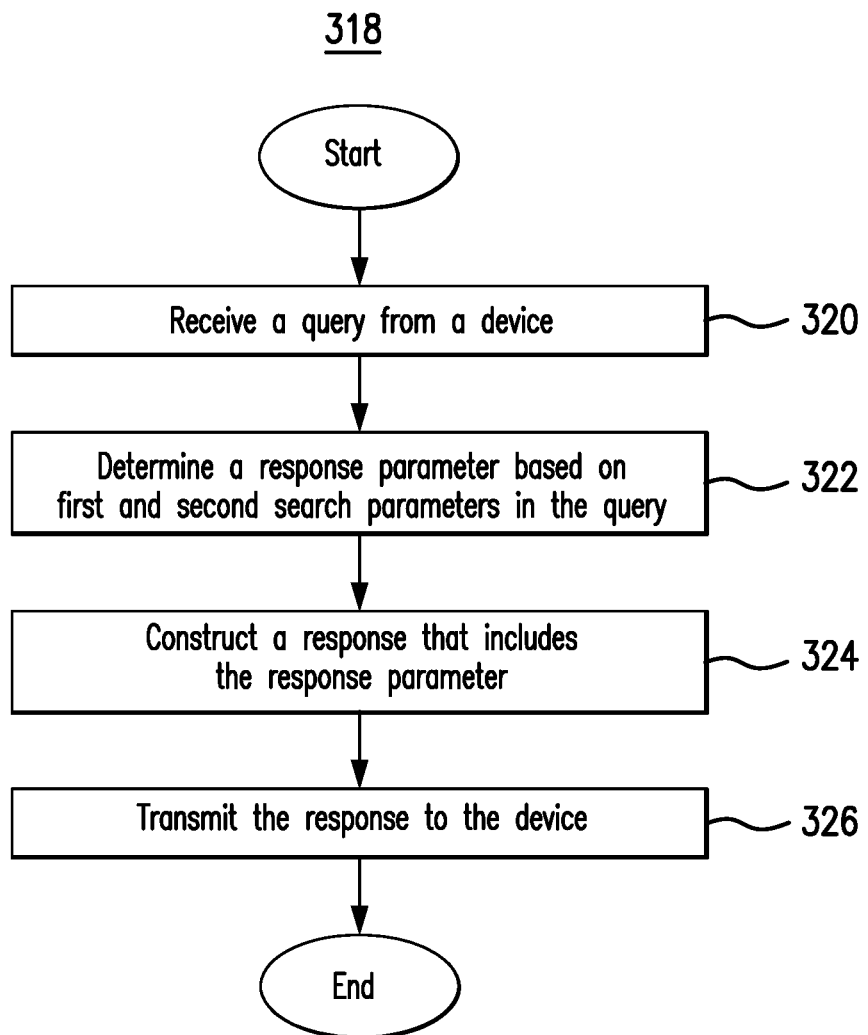

FIG. 3B illustrates a method 318 of operating a query response enhancer 206. Generally, processor 230 of query response enhancer 206 performs the steps of method 318. In particular embodiments, by performing method 318, query response enhancer 206 conserves processing and network resources in providing a response 236 that is more likely to be selected by a user 102.

Query response enhancer 206 begins by receiving a query 228 from a device such as search query enhancer 202 in step 320. The query 228 may be an enhanced query that includes parameters 214 and parameters 218. The query 228 may also include an instruction 224 and a likelihood 222. Query response enhancer 206 may analyze this information to provide a response 236. In step 322, query response enhancer 206 determines a response parameter 234 based on first parameters 214 and second parameters 218. Response parameters may indicate information that will make a response more likely to be selected by user 102. In step 324, query response enhancer 206 constructs a response 236 that includes the response parameter 234. Query response enhancer 206 then transmits the response 236 to the search query enhancer 202 in step 326.

Modifications, additions, or omissions may be made to methods 300 and 318 depicted in FIGS. 3A and 3B. Methods 300 and 318 may include more, fewer, or other steps. For example, steps may be performed in parallel or in any suitable order. While discussed as search query enhancer 202 and query response enhancer 206 (or components thereof) performing the steps, any suitable component of system 200 may perform one or more steps of the methods.

Figure 4A:
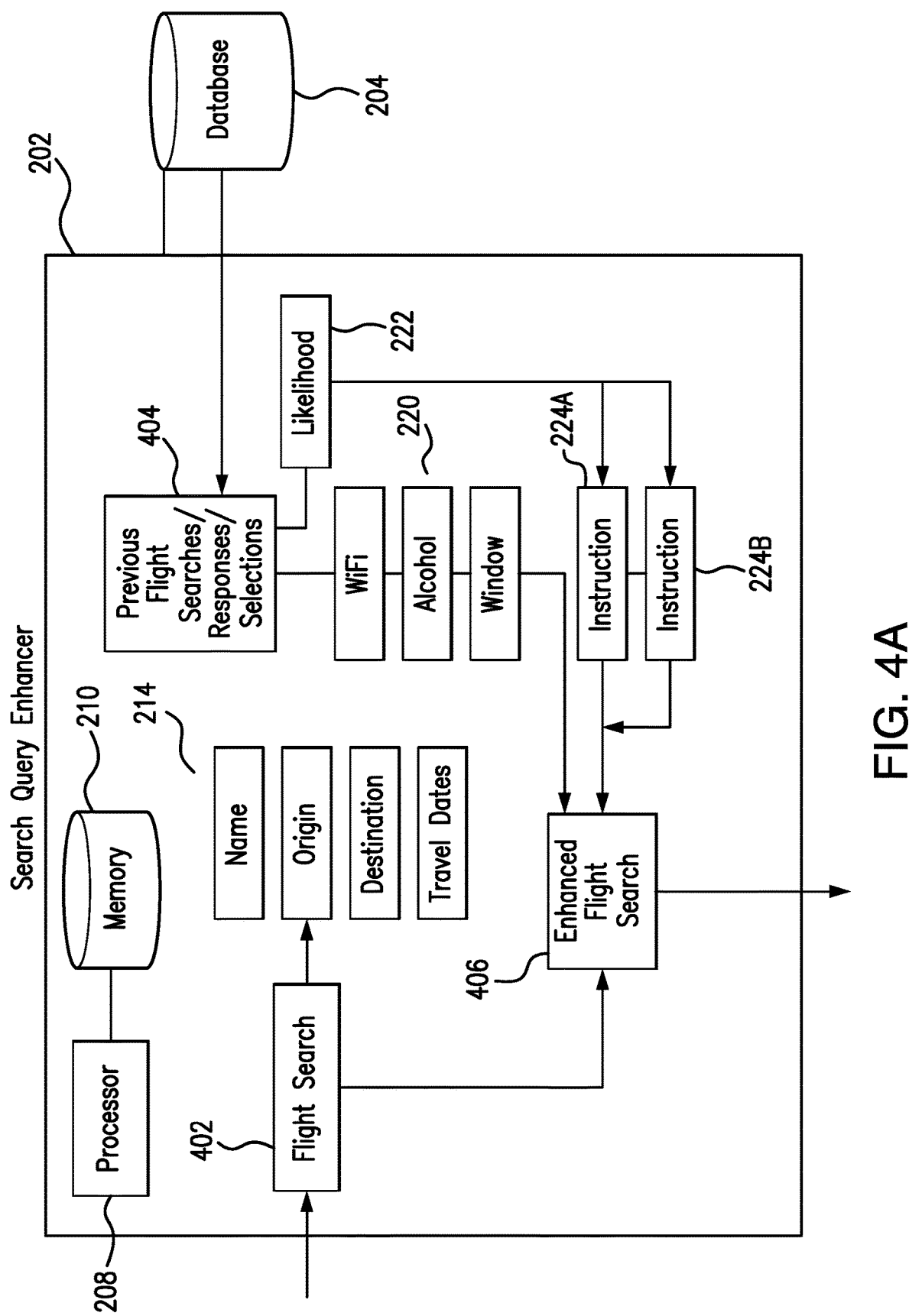
FIGS. 4A-4C illustrate an embodiment of an enhanced database querying system.
Figure 4B:
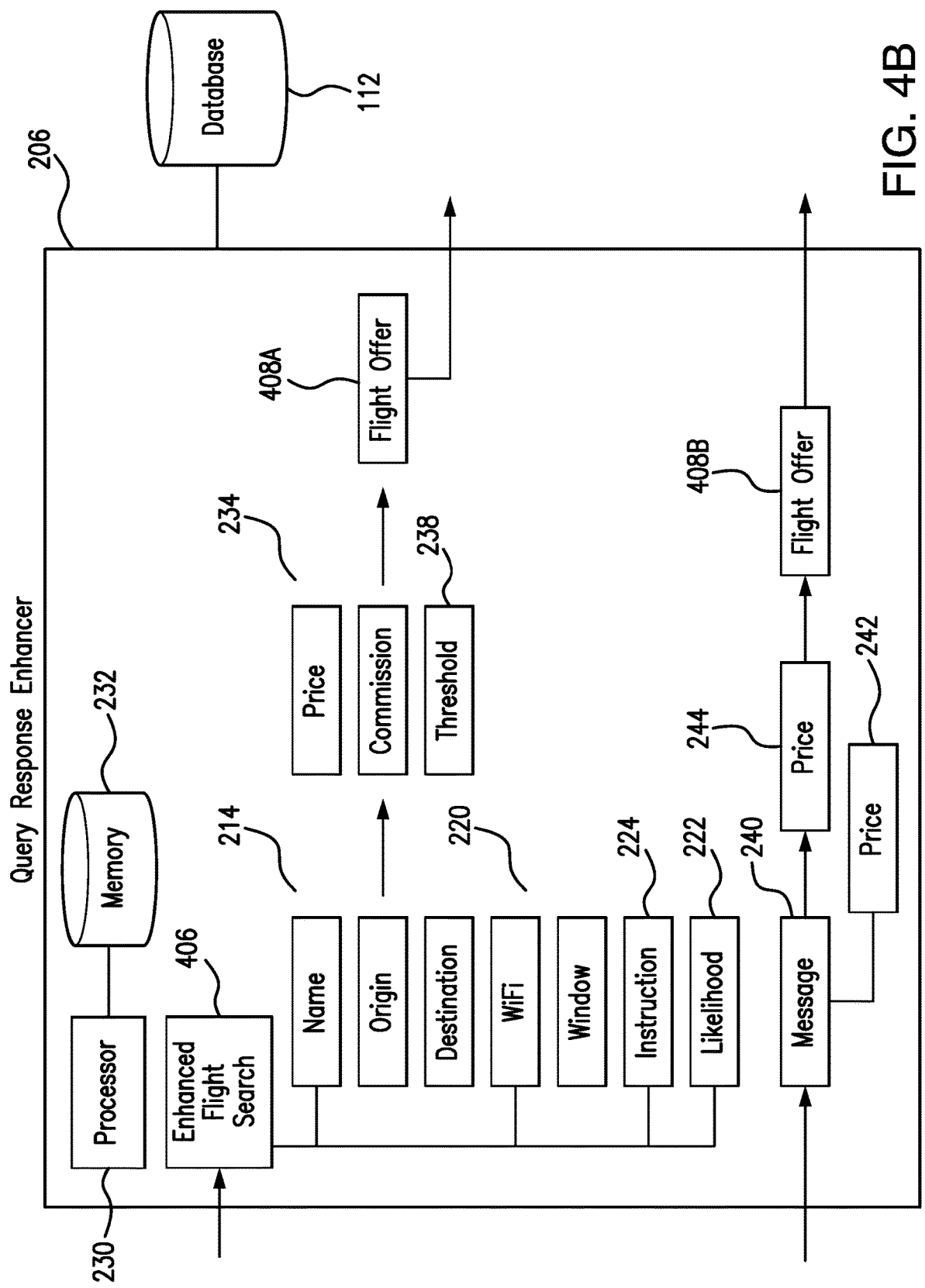
Figure 4C:
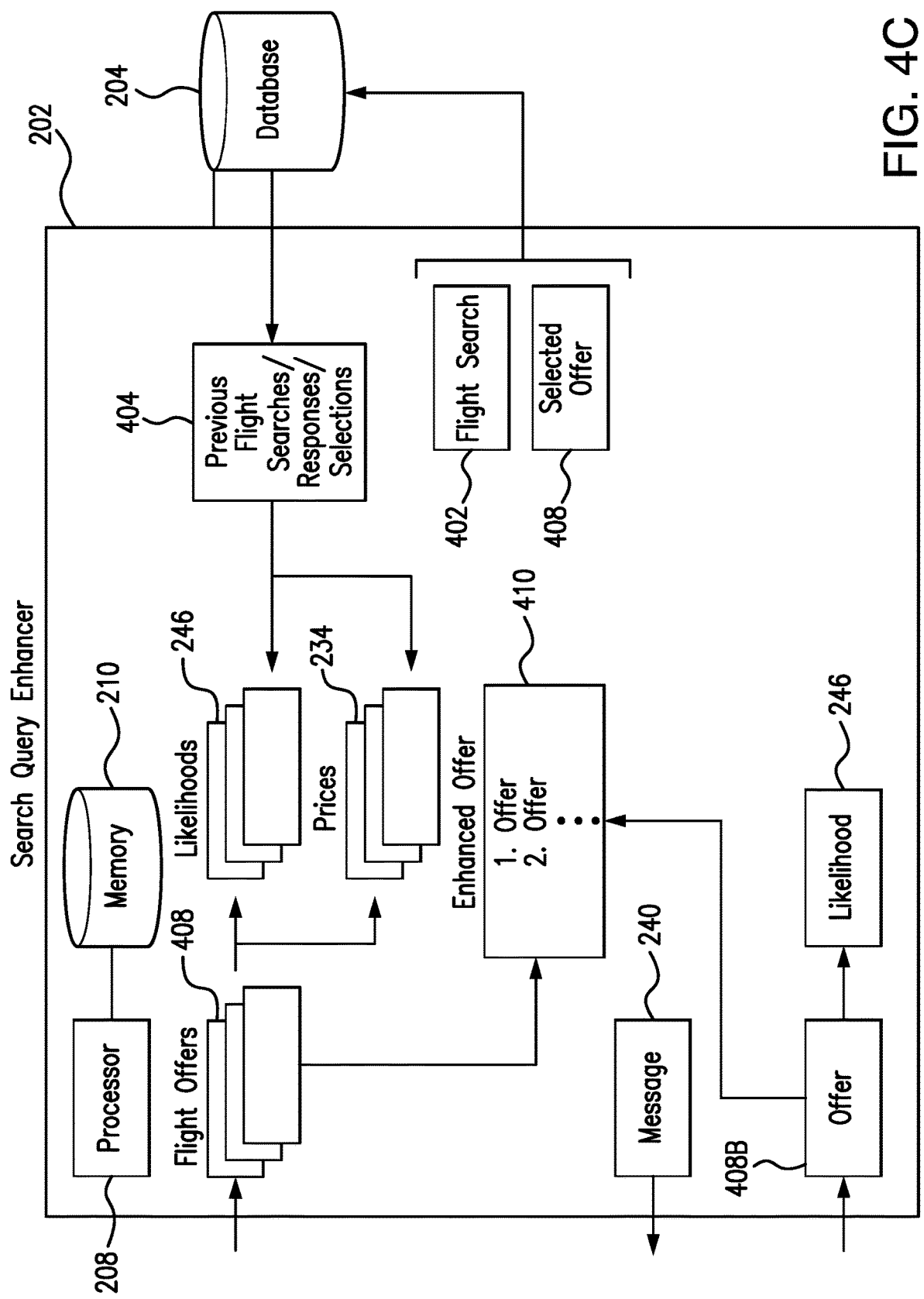

FIGS. 4A-4C illustrate search query enhancer 202 and query response enhancer 206 operating in a particular context to clarify the operation described in FIGS. 2A-2D. Although FIGS. 4A-4C show search query enhancer 202 and query response enhancer 206 operating in the context of an airline flight search, it is understood that search query enhancer 202 and query response enhancer 206 may operate in any appropriate context.

FIG. 4A illustrates search query enhancer 202 receiving a flight search 402 and generating an enhanced flight search 406. Search query enhancer 202 receives a flight search 402 from a user 102. Flight search 402 may include parameters 214 provided by user 102 such as, for example, the name of user 102, an origin and destination for the flight, and travel dates. Search query enhancer 202 then retrieves previous flight searches, previous responses, or previous selections 404 from database 204. Previous flight searches, previous responses, or previous selections 404 may include flight searches that were previously issued by user 102 (or a category of users to which user 102 belongs, such as business traveler or leisure traveler, domestic traveler or international traveler, daytime traveler or evening traveler, etc.) and flight searches that were previously issued by other users. Previous flight searches, previous responses, or previous selections 404 may include certain preferences 220 of user 102 (or the category of users) such as, for example, whether user 102 (or the category of users) wants Wi-Fi access on the flight, whether user 102 (or the category of users) wants alcohol available on the flight, and/or whether user 102 (or the category of users) prefers a window seat on the flight. Search query enhancer 202 may glean these preferences (along with other information) by applying a machine learning algorithm on previous flight searches, previous responses, or previous selections 404 to learn what user 102 (or the category of users) is likely to prefer in a flight.

Previous flight searches, previous responses, or previous selections 404 may also indicate a likelihood 222 of user 102 selecting a flight from a particular query response enhancer 206 of a particular airline. Based on that likelihood, search query enhancer 202 may provide particular instructions 224 for enhanced flight search 406. For example, instruction 224A may instruct a particular query response enhancer 206 to not expend additional machine resources in responding to enhanced flight search 406. Instruction 224B may instruct a query response enhancer 206 to expend additional resources responding to enhanced flight search 406 because user 102 has a likely chance of selecting a response from that particular query response enhancer 206. Search query enhancer

202 may communicate enhanced flight search 406 to one or more systems, which may include one or more query response enhancers 206. Each query response enhancer 206 may belong to a different airline. Each airline may desire to respond to enhanced flight search 406 by providing different flight offers back to user 102 for selection.

FIG. 4B illustrates query response enhancer 206 operating in the airline context. As seen in FIG. 4B, query response enhancer 206 receives a flight search, such as enhanced flight search 406 from search query enhancer 202. Enhanced flight search 406 includes parameters 214 such as the name of the user 102 and/or the origin and the destination of the flight. Enhanced flight search 406 also includes preferences 220 of user 102 such as, for example, a preference for Wi-Fi access and a window seat. These preferences 220 may have been determined by search query enhancer 202 by applying a machine learning algorithm on previous flight searches, previous responses, or previous selections 404. Enhanced flight search 406 also includes instruction 224 and likelihood 222 that can be used to evaluate how query response enhancer 206 should generate a response.

Based on parameters 214, query response enhancer 206 may generate additional parameters 234, such as a price of the flight and a commission to be paid for the flight. Query response enhancer 206 may include these parameters 234 and a flight offer 408A. In certain embodiments, query response enhancer 206 may generate parameters 234 and/or flight offer 408A by directly querying database 112. Query response enhancer 206 may be instructed by instruction 224 to directly query database 112 using parameters 214. In some embodiments, query response enhancer 206 may determine that database 112 should be directly queried using parameters 214, because likelihood 222 indicates that it was likely the case that flight search 402 was automatically and programmatically generated. Such as, for example, by an artificial intelligence system. By directly querying database 112 using parameters 214 and not preferences 220, query response enhancer 206 conserves resources in generating a flight offer 408A that may not be likely to be selected by a user 102. In some instances, query response enhancer 206 generates flight offer 408A by expending additional machine resources to analyze preferences 220 in additional to parameters 214. Query response enhancer 206 may generate a more targeted flight offer 408A by considering first parameters 214 and preferences 220. In some embodiments, query response enhancer 206 may determine that first parameters 214 and preferences 220 should be considered in generating flight offer 408A based on instruction 224. For example, instruction 224 may indicate that the user 102 is likely to select a response 408A from query response enhancer 206 thus, it may be more efficient for query response enhancer 206 to expend additional resources to generate a flight offer 408A that is likely to be selected by the user 102.

Query response enhancer 206 may communicate flight offer 408A back to the flight search origin, such as search query enhancer 202, for arrangement and/or selection by user 102. In some embodiments, after communicating flight offer 408A to search query enhancer 202, query response enhancer 206 may receive a message 240 from search query enhancer 202. Message 240 may indicate a factor such as price that will affect whether user 102 is likely to select flight offer 408A. In response to receiving message 240, query response enhancer 206 may update the price to produce an updated price 244. Query response enhancer 206 may then generate an updated flight offer 408B and communicate the updated flight offer 408B to search query enhancer 202. In this manner, query response enhancer 206 may generate iterative flight offers 408 based on subsequent information provided by search query enhancer 202.

FIG. 4C illustrates search query enhancer 202 generating an enhanced flight offer. As seen in FIG. 4C, search query enhancer 202 receives multiple flight offers 408 from airlines. Search query enhancer determines likelihoods 246 that the user 102 will select flight offers 408. Search query enhancer 202 may determine the likelihoods 246 from previous flight searches, previous responses, or previous selections 404. In some embodiments, search query enhancer 202 may also determine prices 234 for one or more flight offers 408 based on previous flight searches, previous responses, or previous selections 404. Search query enhancer 202 then arranges one or more offers 408 into an enhanced offer 410. In some embodiments, search query enhancer 202 may rank offers 408 in enhanced offer 410 based on the likelihoods 246 that a particular offer 408 will be selected by user 102. In some embodiments, search query enhancer 202 may communicate a message 240 to query response enhancer 206 to indicate if an offer 408 is more likely to be accepted by user 102 if a factor such as price 234 is changed. In response, search query enhancer 202 receives an updated offer 408B from query response enhancer 206. Search query enhancer 202 may determine an updated likelihood 246 for offer 408B based on previous flight searches 404. Search query enhancer 202 may then add offer 408B to enhanced offer 410.

After search query enhancer 202 communicates enhanced offer 410 to devices 104 for selection by user 102, search query enhancer 202 may determine which offers 408 were selected by user 102. In response, search query enhancer 202 may add flight search 402 and the selected offer 408 to database 204 so that this information may be used to analyze and evaluate subsequent flight searches 402.

As an example, search query enhancer 202 may receive several flight offers 408 from multiple airlines. Each flight offer 408 may respond to flight search 402 issued by user 102. The flight offers 408 may include commission and pricing information 234 available for the sale of the product being offered. Search query enhancer 202 may compare the received offers 408 to each other and transmit to user 102 (or to an agency representing user 102) the offers 408 along with comparative information about the pricing and commissions 234 available for the sale of the products being offered. For example, search query enhancer 202 may rank the offers 408 for a user 102 based on the pricing information 234 provided by the airlines (e.g., cheapest offers 408 are presented first). As another example, search query enhancer 202 may rank the offers 408 for an agency based on the commission information 234 provided by the airlines (e.g., offers 408 with the highest commissions are presented first). Search query enhancer 202 may eliminate certain offers 408 from being included in enhanced offer 410 based on the pricing and commission information 234. For example, search query enhancer 202 may exclude an offer 408 from enhanced offer 410 if the price on the offer 408 is too expensive. As another example, search query enhancer 202 may exclude an offer 408 from enhanced offer 410 if the commission on the offer 408 is too low. In this manner, search query enhancer 202 may rank offers 408 based on the intended recipient/audience of offers 408.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A search query enhancer comprising:
a memory; and
a hardware processor communicatively coupled to the memory, the hardware processor configured to:
receive a query from a device, the query comprising first search parameters;
based on the first search parameters, retrieve data from a database, the data comprising at least one of a plurality of previously issued queries, a plurality of responses generated for the plurality of previously issued queries, and a plurality of selections made from the plurality of responses;
apply a machine learning algorithm based at least on the retrieved data to determine second search parameters, wherein determining the second search parameters comprises:
determining a first likelihood that a response from a first response system of a plurality of response systems will be selected;
form an enhanced query based at least on the query and the second search parameters;
communicate the enhanced query to the plurality of response systems;
receive, from the plurality of response systems, a plurality of responses to the enhanced query;
determine a price for at least one of the responses of the plurality of responses to the enhanced query;
determine a second likelihood that at least one of the responses of the plurality of responses to the enhanced query will be selected, wherein the determined second likelihood is based at least in part on the determined price;
construct, based on the plurality of responses to the enhanced query, an enhanced response to the query, wherein the enhanced response comprises a ranking of each response based on the determined second likelihood; and
communicate the enhanced response to the device.

2. The search query enhancer of claim 1, wherein the processor is further configured to:
determine that the query was initiated by a user, and the retrieved data comprises at least one of a plurality of queries previously issued by the user, a plurality of responses communicated to the user, and a plurality of selections made by the user; and
determine, based on the retrieved data and by applying the machine learning algorithm, a preference of the user, wherein the second search parameters comprise the preference of the user.

3. The search query enhancer of claim 1, wherein:
the processor is further configured to:
determine that the query was initiated by a user, and the retrieved data comprises at least one of a plurality of queries previously issued by the user, a plurality of responses communicated to the user, and a plurality of selections made by the user; and
for each response of the plurality of responses to the enhanced query, determine, based on the retrieved data, a likelihood that the user will select that response; and
constructing the enhanced response comprises adding to the enhanced response, a response of the plurality of responses to the enhanced query based on the determined likelihood that the user will select that response.

4. The search query enhancer of claim 1, wherein the processor is further configured to:
determine that the query was initiated by a category of user, and the retrieved data comprises at least one of a plurality of queries previously issued by the category of user, a plurality of responses communicated to the category of user, and a plurality of selections made by the category of user; and
determine, based on at least the retrieved data and by applying the machine learning algorithm, a preference of the category of user, wherein the second search parameters comprise the preference.

5. The search query enhancer of claim 1, wherein forming the enhanced query comprises:
if the first likelihood is below a threshold, adding an instruction that the first response system form the response by querying the database using the first search parameters; and
if the first likelihood is above the threshold, adding an instruction that the first response system form the response using the second search parameters.

6. The search query enhancer of claim 5, wherein the first response system is configured to:
receive the enhanced query;
if the determined first likelihood is below the threshold, construct the response by adding to the response a result of querying the database using the first search parameters; and
if the determined first likelihood is above the threshold, construct the response by adding to the response a result of evaluating the second search parameters.

7. The search query enhancer of claim 1, the hardware processor further configured to:
after receiving the plurality of responses, communicate, to the first response system of the plurality of response systems, a message indicating a factor that affects a likelihood that a response of the plurality of responses will be selected, wherein the response of the plurality of responses is received from the first response system; and
receive, from the first response system, a second response based on the message, wherein the second response incorporates a change based on the indicated factor and the enhanced response is constructed further based on the second response from the first response system.

8. The search query enhancer of claim 1, wherein:
determining the second search parameters comprises determining a likelihood that the query was automatically and programmatically generated; and
the enhanced query comprises the determined likelihood.

9. The search query enhancer of claim 1, the hardware processor further configured to:
retrieve, from the database and based on the plurality of responses, a plurality of previously selected responses; and
apply a machine learning algorithm on the plurality of previously selected responses to determine a response parameter for each response of the plurality of responses, wherein the enhanced response comprises the response parameter for each response of the plurality of responses.

10. The search query enhancer of claim 1, the hardware processor further configured to:
add the query to the database;

determine that a first response of the plurality of responses was selected; and add the first response to the database.

11. A method comprising:

receiving, by a hardware processor, a query from a device, the query comprising first search parameters;

retrieving, by the processor and based on the first search parameters, data from a database, the data comprising at least one of a plurality of previously issued queries, a plurality of responses generated for the plurality of previously issued queries, and a plurality of selections made from the plurality of responses;

applying, by the processor, a machine learning algorithm based at least on the retrieved data to determine second search parameters, wherein determining the second search parameters comprises:

determining a first likelihood that a response from a first response system of a plurality of response systems will be selected;

forming an enhanced query, by the processor, based at least on the query and the second search parameters;

communicating, by the processor, the enhanced query to the plurality of response systems;

receiving, from the plurality of response systems, a plurality of responses to the enhanced query;

determining a price for at least one of the responses of the plurality of responses to the enhanced query;

determining a second likelihood that at least one of the responses of the plurality of responses to the enhanced query will be selected, wherein the determined second likelihood is based at least in part on the determined price;

constructing, by the processor, based on the plurality of responses to the enhanced query, an enhanced response to the query, wherein the enhanced response comprises a ranking of each response based on the determined second likelihood; and communicating the enhanced response to the device.

12. The method of claim 11, further comprising:

determining, by the processor, that the query was initiated by a user and the retrieved data comprises at least one of a plurality of queries previously issued by the user, a plurality of responses communicated to the user, and a plurality of selections made by the user; and determining, by the processor, a preference of the user, based on at least the retrieved data and by applying the machine learning algorithm;

wherein the second search parameters comprise the preference.

13. The method of claim 11, further comprising:

determining, by the processor, that the query was initiated by a user and the retrieved data comprises at least one of a plurality of queries previously issued by the user, a plurality of responses communicated to the user, and a plurality of selections made by the user; and for each response of the plurality of responses to the enhanced query, determine, by the processor, based on the retrieved data, a likelihood that the user will select that response;

wherein constructing the enhanced response comprises adding to the enhanced response, a response of the plurality of responses to the enhanced query based on the determined likelihood that the user will select that response to the enhanced query.

14. The method of claim 11, wherein forming the enhanced query comprises:

if the first likelihood is below a threshold, adding an instruction that the first response system form the response by querying the database using the first search parameters; and if the first likelihood is above the threshold, adding an instruction that the first response system form the response using the second search parameters.

15. The method of claim 11, further comprising:

after receiving the plurality of responses, communicating, to the first response system of the plurality of response systems, a message indicating a factor that affects a likelihood that a response of the plurality of responses will be selected;

wherein the response of the plurality of responses is received from the first response system;

receiving, from the first response system, a second response based on the message, wherein the second response incorporates a change based on the indicated factor; and constructing the enhanced response is further based on the second response from the first response system.

16. The method of claim 11, further comprising:

determining the second search parameters comprises determining a likelihood that the query was automatically and programmatically generated; and the enhanced query comprises the determined likelihood.

17. The method of claim 11, further comprising:

retrieving, from the database and based on the plurality of responses, a plurality of previously selected responses; and applying a machine learning algorithm on the plurality of previously selected responses to determine a response parameter for each response of the plurality of responses, wherein the enhanced response comprises the response parameter for each response of the plurality of responses.

18. The method of claim 11, further comprising:

adding the query to the database;

determining that a first response of the plurality of responses was selected; and adding the first response to the database.

* * * * *